US010699393B2

(12) United States Patent
Shohara

(10) Patent No.: US 10,699,393 B2
(45) Date of Patent: Jun. 30, 2020

(54) IMAGE PROCESSING APPARATUS AND IMAGE PROCESSING METHOD

(71) Applicant: Makoto Shohara, Tokyo (JP)

(72) Inventor: Makoto Shohara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 158 days.

(21) Appl. No.: 15/979,928

(22) Filed: May 15, 2018

(65) Prior Publication Data

US 2018/0260945 A1 Sep. 13, 2018

Related U.S. Application Data

(63) Continuation of application No. PCT/JP2016/085294, filed on Nov. 29, 2016.

(30) Foreign Application Priority Data

Dec. 15, 2015 (JP) ................... 2015-243679

(51) Int. Cl.
*G06T 5/00* (2006.01)
*G06T 5/50* (2006.01)
(Continued)

(52) U.S. Cl.
CPC ............. *G06T 5/50* (2013.01); *G06T 5/009* (2013.01); *H04N 5/235* (2013.01);
(Continued)

(58) Field of Classification Search
None
See application file for complete search history.

(56) References Cited

U.S. PATENT DOCUMENTS 9,307,144 B2 4/2016 Tanaka et al.
9,392,167 B2 7/2016 Shohara et al.
(Continued)

FOREIGN PATENT DOCUMENTS

EP 2775719 9/2014
JP 2002-247362 8/2002
(Continued)

OTHER PUBLICATIONS

Extended European Search Report for 16875379.6 dated Oct. 15, 2018.
(Continued)

*Primary Examiner* — Delomia L Gilliard
(74) *Attorney, Agent, or Firm* — IPUSA, PLLC

(57) ABSTRACT

An image processing apparatus for processing an image includes an image capturing device configured to perform image capturing operations a plurality of times under different image capturing conditions to generate a plurality of captured images; a storage device configured to store coefficient data for each of the image capturing conditions; and a processor configured to implement processes of converting a captured image of the plurality of captured images to generate a converted image indicating a luminance and a color difference, and generating a composite image by compositing a plurality of the converted images based on the coefficient data for each of the image capturing conditions that indicates a coefficient for the luminance indicated by each of the converted images.

8 Claims, 8 Drawing Sheets

(51) Int. Cl.
  *H04N 9/04* (2006.01)
  *H04N 5/235* (2006.01)
  *H04N 9/64* (2006.01)
  *H04N 5/367* (2011.01)

(52) U.S. Cl.
  CPC ........... *H04N 5/2356* (2013.01); *H04N 5/367* (2013.01); *H04N 9/045* (2013.01); *H04N 9/64* (2013.01); *G06T 2207/10024* (2013.01); *G06T 2207/20212* (2013.01)

(56) References Cited

U.S. PATENT DOCUMENTS

| | | |
|---|---|---|
| 9,491,357 B2 | 11/2016 | Shohara et al. |
| 9,584,694 B2 | 2/2017 | Ito et al. |
| 9,607,358 B2 | 3/2017 | Takenaka et al. |
| 9,756,243 B2 | 9/2017 | Shohara et al. |
| 2013/0235149 A1 | 9/2013 | Tanaka et al. |
| 2014/0071227 A1 | 3/2014 | Takenaka et al. |
| 2014/0078247 A1 | 3/2014 | Shohara et al. |
| 2015/0221087 A1 | 8/2015 | Houjou et al. |
| 2016/0182825 A1 | 6/2016 | Tanaka et al. |

FOREIGN PATENT DOCUMENTS

| | | | |
|---|---|---|---|
| JP | 2005-197952 | | 7/2005 |
| JP | 2005197952 A | * | 7/2005 |
| JP | 2013-051584 | | 3/2013 |
| JP | 2013-138301 | | 7/2013 |
| JP | 2013138301 A | * | 7/2013 |
| JP | 2015-033064 | | 2/2015 |
| JP | 2015-084512 | | 4/2015 |
| JP | 2015-084512 A | * | 4/2015 |
| JP | 2016-040870 | | 3/2016 |

OTHER PUBLICATIONS

Tomislav Kartalov et al : "A real time algorithm for exposure fusion of digital images", Melecon 2010—2010 15th IEEE Mediterranean Electrotechnical Conference, IEEE, Piscataway, NJ, USA, Apr. 26, 2010 (Apr. 26, 2010), pp. 641-646, XP031683329, ISBN: 978-1-4244-5793-9.

International Search Report dated Feb. 28, 2017 in PCT/JP2016/085294 filed on Nov. 29, 2016.

* cited by examiner

IMAGE PROCESSING APPARATUS AND IMAGE PROCESSING METHOD

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2016/085294 filed on Nov. 29, 2016 and designating the U.S., which claims priority to Japanese Patent Application No. 2015-243679 filed on Dec. 15, 2015. The entire contents of the foregoing applications are incorporated herein by reference.

BACKGROUND OF THE INVENTION

1. Field of the Invention

The present invention relates to an image processing apparatus and an image processing method.

2. Description of the Related Art

Techniques for generating an image by compositing multiple images obtained by performing image capturing operations multiple times are known.

For example, Japanese Unexamined Patent Publication No. 2013-51584 describes a technique for increasing the dynamic range in compositing multiple exposure images. The technique provides an image compositing process of selecting pixel values of one image from among multiple images based on a comparison of the pixel values of the multiple images and an image compositing process of adding the multiple images together or subtracting one image from the other, where the image compositing process to be implemented is selected according to the image capturing mode.

However, in conventional techniques, the image quality of an image that is output may be degraded when multiple images are captured under different image capturing conditions.

In view of the above problems of the related art, one object of the present invention is to provide an image processing apparatus that can output an image with good image quality when multiple images are captured under different image capturing conditions.

SUMMARY OF THE INVENTION

One aspect of the present invention is directed to providing an image processing apparatus that can output an image with good image quality when multiple images are captured under different image capturing conditions.

According to one embodiment of the present invention, an image processing apparatus for processing an image is provided that includes an image capturing device configured to perform image capturing operations a plurality of times under different image capturing conditions to generate a plurality of captured images; a storage device configured to store coefficient data for each of the image capturing conditions; and a processor configured to implement processes of converting a captured image of the plurality of captured images to generate a converted image indicating a luminance and a color difference, and generating a composite image by compositing a plurality of the converted images based on the coefficient data for each of the image capturing conditions that indicates a coefficient for the luminance indicated by each of the converted images.

DESCRIPTION OF THE EMBODIMENTS

Figure 1:
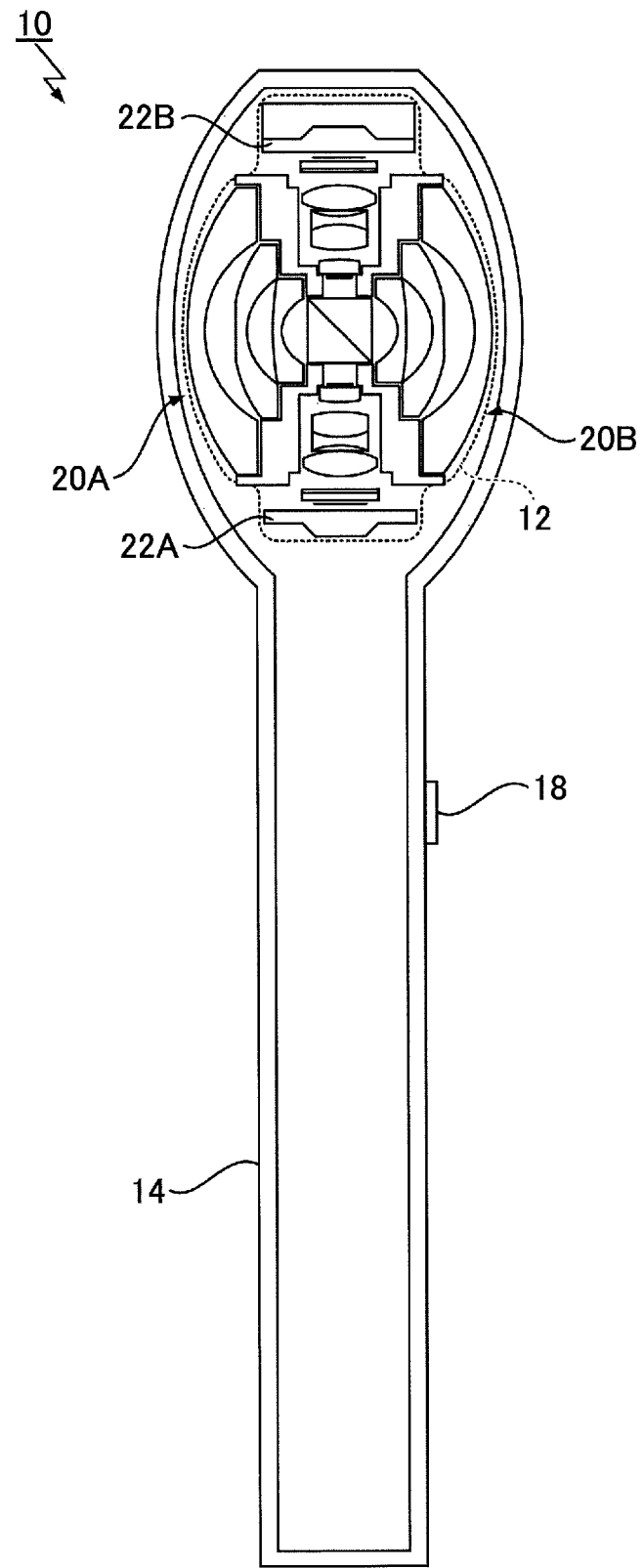
FIG. 1 is a cross-sectional diagram illustrating an example overall configuration of an image processing apparatus according to an embodiment of the present invention.

In the following, embodiments of the present invention are described with reference to the accompanying drawings. Note that in the present description and the drawings, elements having substantially the same functional features are given the same reference numerals and overlapping descriptions may be omitted.

First Embodiment

<Image Processing Apparatus Example>

FIG. 1 is a cross-sectional diagram illustrating an example overall configuration of an image processing apparatus according to an embodiment of the present invention. The image processing apparatus 10 may have a compound eye configuration, for example. Specifically, the image processing apparatus 10 includes an image capturing device 12, a housing 14, and a shutter button 18.

The image capturing device 12 may include, for example, an imaging optical system 20A, an imaging optical system 20B, a solid-state imaging element 22A, and a solid-state imaging element 22B.

The solid-state imaging element 22A and the solid-state imaging element 22B are optical sensors, such as CCDs (Charge Coupled Devices) or CMOS (Complementary Metal Oxide Semiconductor) sensors.

The imaging optical system 20A and the imaging optical system 20B may be so-called fisheye lenses having 7 elements in 6 groups, for example. Also, a combined image capturing range of the imaging optical system 20A and the imaging optical system 20B is preferably greater than or equal to 360°. Further, preferably, the imaging optical system 20A and the imaging optical system 20B respectively have fields of view of at least 180°, and more preferably fields of view of at least 185° or at least 190°, such that the imaging optical system 20A and the imaging optical system 20B have overlapping image capturing ranges. Note that the overlapping image capturing ranges may be used as a reference upon performing a stitching process for stitching images together.

The imaging optical system 20A and the imaging optical system 20B include optical systems, such as prisms, filters, and diaphragms.

The solid-state imaging element 22A and the solid-state imaging element 22B correspond to the imaging optical system 20A and the imaging optical system 20B, respectively. Also, as illustrated, the positions of the solid-state imaging element 22A and the solid-state imaging element 22B may be arranged such that light entering each imaging optical system orthogonally intersects with a center portion of a light receiving region of a corresponding solid-state imaging element, and the light receiving region constitutes a coupling surface of the corresponding lens, for example. Further, each solid-state imaging element may have a light receiving region, convert light entering the light receiving region into an image signal, and output the image signal. In the present example, it is assumed that the imaging optical system 20A and the imaging optical system 20B have the same specification, the solid-state imaging element 22A and the solid-state imaging element 22B have the same specification, and these elements are arranged to oppose each other such that their optical axes coincide.

Note that the image capturing device is not limited to a configuration with two solid-state imaging elements and two imaging optical systems. The image capturing device may have three or more solid-state imaging elements and three or more imaging optical systems, for example. In the following, an example case where the image capturing device has two pairs of solid-state imaging devices and imaging optical systems will be described.

The housing 14 includes components, such as a controller of the image capturing device 12 and a battery as a power source. Further, the shutter button 18 is arranged at the housing 14 for enabling an operation of releasing the shutter of the image capturing device 12.

The image processing apparatus 10 performs a process of stitching together images captured by the image capturing device 12 (hereinafter referred to as "captured images"). Then, the image processing apparatus 10 performs a process of stitching together and compositing multiple captured images to generate a composite image covering a solid angle of 4π steradians (hereinafter referred to as "omnidirectional image"). Note that an omnidirectional image is an image capturing all directions viewable from an image capturing point. That is, an omnidirectional image may be a so-called panoramic image with a horizontal plane covering a 360° image capturing range.

The image processing apparatus 10 can facilitate execution of processes by arranging the scanning directions of the solid-state imaging element 22A and the solid-state imaging element 22B to coincide. That is, by arranging the scanning directions and order to coincide at portions where a stitching process is to be executed, it may be easier to execute a process of stitching together an imaged object, particularly a moving object, captured by each solid-state imaging element. For example, when the upper left portion of an image of the solid-state imaging element 22A and the lower left portion of an image of the solid-state imaging element 22B coincide with each other to constitute portions where a stitching process is to be executed, the scanning direction of the solid-state imaging element 22A may be arranged to go from top to bottom and right to left. Also, when the upper left portion of the image of the solid-state imaging element 22A and the lower left portion of the image of the solid-state imaging element 22B coincide with each other to constitute portions where a stitching process is to be executed, the scanning direction of the solid-state imaging element 22B may be arranged to go from bottom to top and from left to right. By arranging the scanning directions to coincide based on the portions where a stitching process is to be executed, the image processing apparatus 10 can facilitate the execution of the stitching process.

The image processing apparatus 10 may cause an output device, such as a display device or an image forming apparatus, to output the image that has been processed, for example. Also, the image processing apparatus 10 may output the image to a recording medium, such as a SD (registered trademark) card or a CompactFlash (registered trademark) card, for example.

<Hardware Configuration Example>

Figure 2:
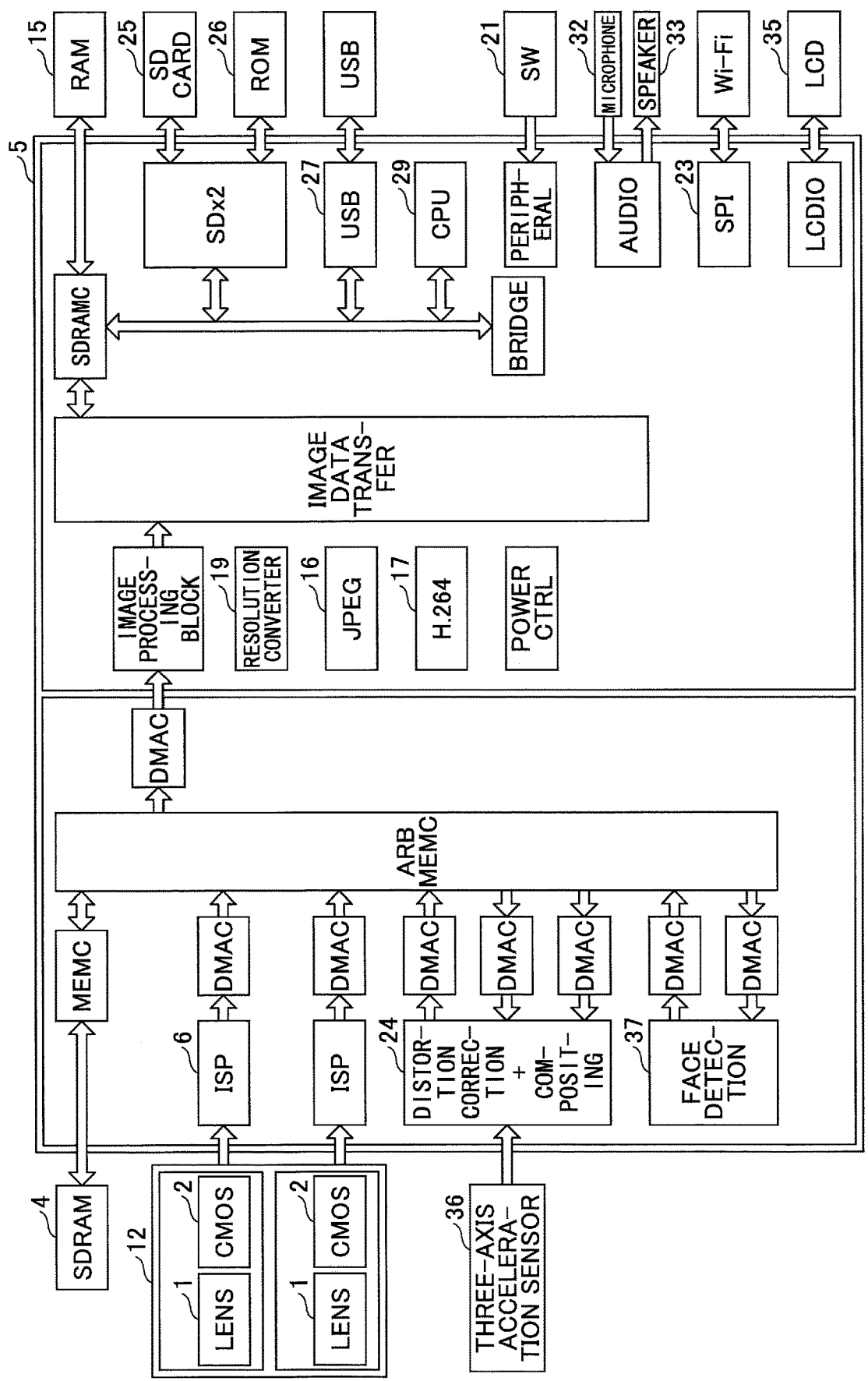
FIG. 2 is a block diagram illustrating an example hardware configuration of the image processing apparatus according to an embodiment of the present invention.

FIG. 2 is a block diagram illustrating an example hardware configuration of the image processing apparatus according to an embodiment of the present invention. The illustrated image processing apparatus includes the image capturing device 12. The image capturing device 12 includes a lens 1 as an example of an optical system and a CMOS sensor 2 as an example of a solid-state imaging element.

The image capturing device 12 is connected to a digital still camera processor 5. Also, the image capturing device 12 is controlled by a CPU (Central Processing Unit) 29 included in the digital still camera processor 5. Also, the image processing apparatus includes a ROM (Read-Only Memory) 26, such as a NAND FLASH. Further, the ROM 26 stores data, such as control programs and parameters used by the CPU 29.

The image processing apparatus includes a switch 21 such as a power switch. When the switch 21 is turned on, processes such as loading a control program stored in the ROM 26 into a main memory and the like are performed, and the image processing apparatus is activated. Also, the CPU 29 controls operations of various components based on a program. Further, upon executing control and process operations, the CPU 29 stores data in a RAM 15, such as a SDRAM (Synchronous Dynamic Random Access Memory) or a SRAM (Static Random Access Memory). Note that by using a rewritable flash ROM, such as a NAND FLASH, as the ROM 26, a control program or control parameters stored in the ROM 26 may be changed to thereby facilitate function upgrading.

An ISP (Image Signal Processor) 6 performs various processes on image data input by the CMOS sensor 2, such as white balance, gamma correction, and conversion processes for converting pixel values indicated by image data into luminance and color difference values.

A USB (Universal Serial Bus) 27 performs USB communication with an external device such as a PC (Personal Computer). Also, a SPI (Serial Peripheral Interface) 23 performs serial communication with an external device. Further, a JPEG codec 16 compresses image data into the JPEG format and decompresses image data in the JPEG format. Further, an H.264 video codec 17 compresses image data into the H.264 format and decompresses image data in the H.264 format. Also, a resizer 19 performs an interpolation process and the like on image data to enlarge or reduce the image size. Further, the image processing apparatus may store image data in a SD (registered trademark) card 25, for example. The SD (registered trademark) card 25 may be attached/detached to/from a memory card slot, for example.

The image processing apparatus also includes a SDRAM 4 that stores image data to be used by the ISP 6 and a distortion correction/compositing process device 24, for example. Also, the distortion correction/compositing process device 24 may use data acquired from a three-axis acceleration sensor 36 to perform top-bottom inversion correction, inclination correction, and the like, for example. Further, a face detection device 37 may detect a human face from a corrected image, for example. In this way, the position of a face captured in an image can be determined, for example.

Note that image data is loaded in the digital still camera processor 5. For example, the image data may be "RAW-RGB image data" that has been subjected to white balance and gamma correction by the ISP 6. Also, the image data may also be "YCbCr image data" that has been subjected to luminance and color difference conversion by the ISP 6, for example. Further, the image data may be "JPEG image data" that has been subjected to JPEG compression by the JPEG codec 16, for example.

The image processing apparatus also includes a LCD (Liquid Crystal Display) driver. In this way, the image processing apparatus can cause a connected output device, such as a LCD monitor 35, to output an image. That is, the LCD driver is a drive circuit for driving the LCD monitor 35. The LCD driver performs processes for converting various states into signals for controlling display of the LCD monitor 35.

The image processing apparatus is connected to a microphone 32 that inputs audio generated by a user, for example. Also, the image processing apparatus includes an amplifier for amplifying an audio signal of the audio input by the microphone 32. Further, the image processing apparatus includes a storage device for storing data representing the audio signal.

Also, the image processing apparatus is connected to a speaker 33 that outputs stored audio. Further, the image processing apparatus includes an amplifier for amplifying an audio signal for causing the speaker 33 to output audio.

<Overall Process Example>

Figure 3:
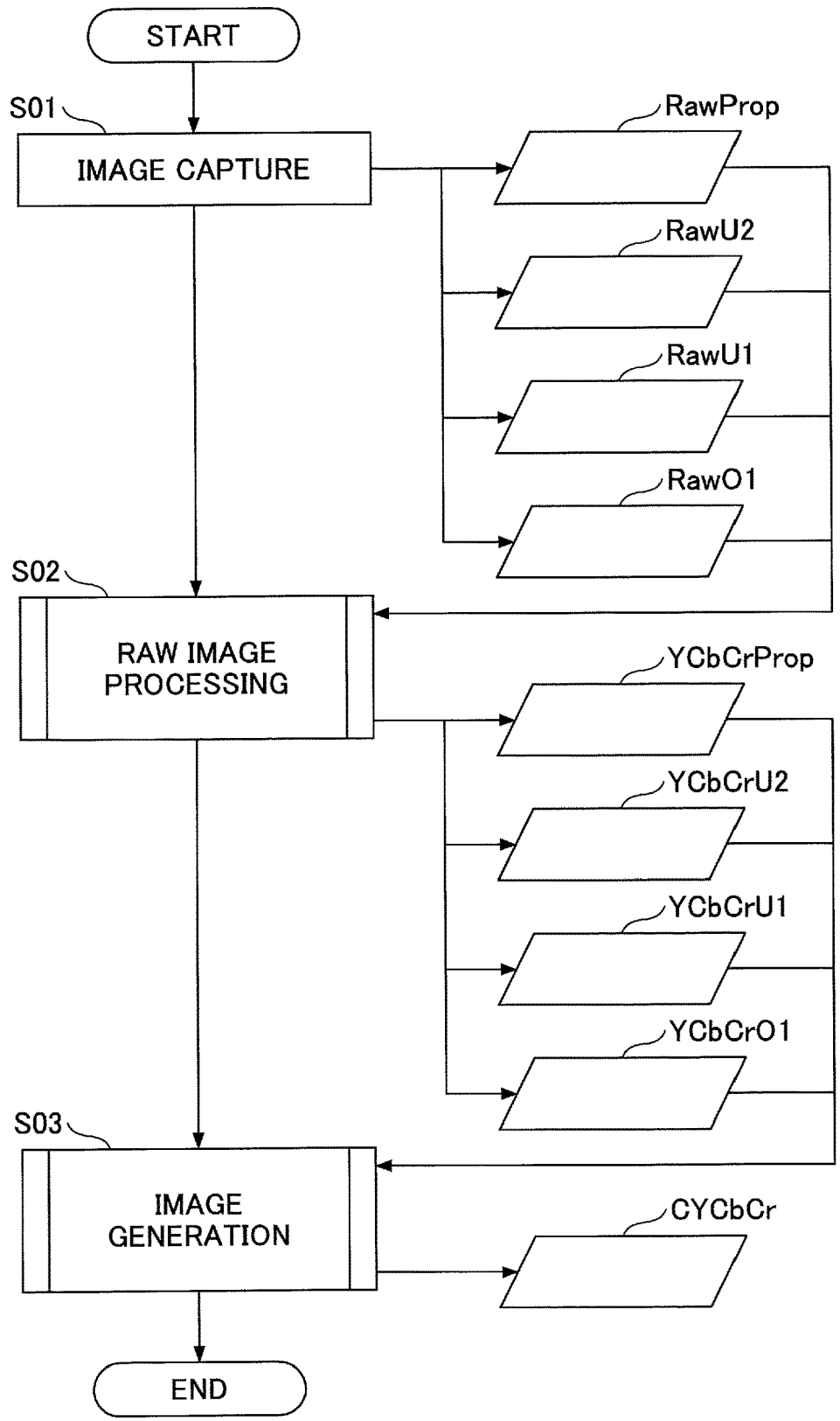
FIG. 3 is a flowchart illustrating an example overall process implemented by the image processing apparatus according to an embodiment of the present invention.

FIG. 3 is a flowchart illustrating an example overall process implemented by the image processing apparatus according to an embodiment of the present invention.

In step S01, the image processing apparatus captures an image. Note that an image capturing technique referred to as bracketing is used to capture an image in step S01. Specifically, the image processing apparatus changes image capturing conditions, such as exposure conditions, and performs image capturing operations multiple times under different image capturing conditions. In the following, an example will be described in which the number of times (M) image capturing operations are performed is set to "M=4". In the present example, different exposure conditions are used in different image capturing conditions. For example, the exposure conditions may include "PropExp", "U2Exp", "U1Exp", and "O1Exp". Further, in the present example, it is assumed that the exposure condition is represented by an EV (Exposure Value), for example. The EV is an example indicator of a condition specifying exposure brightness, such as aperture (f-number) and shutter speed.

In the following, an example will be described in which "PropExp=0 EV", "U2Exp=−2 EV", "U1Exp=−1 EV", and "O1Exp=+2 EV". Note, however, that the image capturing conditions are not limited to the conditions in which "PropExp=0 EV", "U2Exp=−2 EV", "U1Exp=−1 EV", and "O1Exp=+2 EV". For example, the image capturing conditions may be set up in consideration of an upper limit and a lower limit set up based on camera characteristics. Specifically, for example, in a case where "U1Exp" is defined as half the exposure of "U2Exp", and "U2Exp=−0.6 EV" is set up in order to reach the upper limit of "U2Exp", "U1Exp" may be set to "−0.3 EV".

Note that image capturing operations are preferably performed under ISO conditions that are lower than normal AE (Auto Exposure). In other words, when image capturing operations are performed multiple times, the image capturing operations are preferably performed under lower light sensitivity conditions as compared with the case where the number of times image capturing operations are performed is set to "M=1". By performing image capturing operations under low ISO conditions as described above, the image processing apparatus can reduce the influence of noise.

In step S01, image data is generated under each of the image capturing conditions. In the present example, first image data "RawProp" is generated under the condition "PropExp". Also, second image data "RawU2" is generated under the condition "U2Exp". Also, third image data "RawU1" is generated under the condition "U1Exp". Further, fourth image data "RawO1" is generated under the condition "O1Exp". Note that the first image data "RawProp", the second image data "RawU2", the third image data "RawU1" and the fourth image data "RawO1" are in the raw image format.

In step S02, the image processing apparatus performs raw image processing. That is, in step S02, the image processing apparatus performs developing processes on each of the first image data "RawProp", the second image data "RawU2", the third image data "RawU1", and the fourth image data "RawO1" to generate a YCbCr image.

Figure 4:
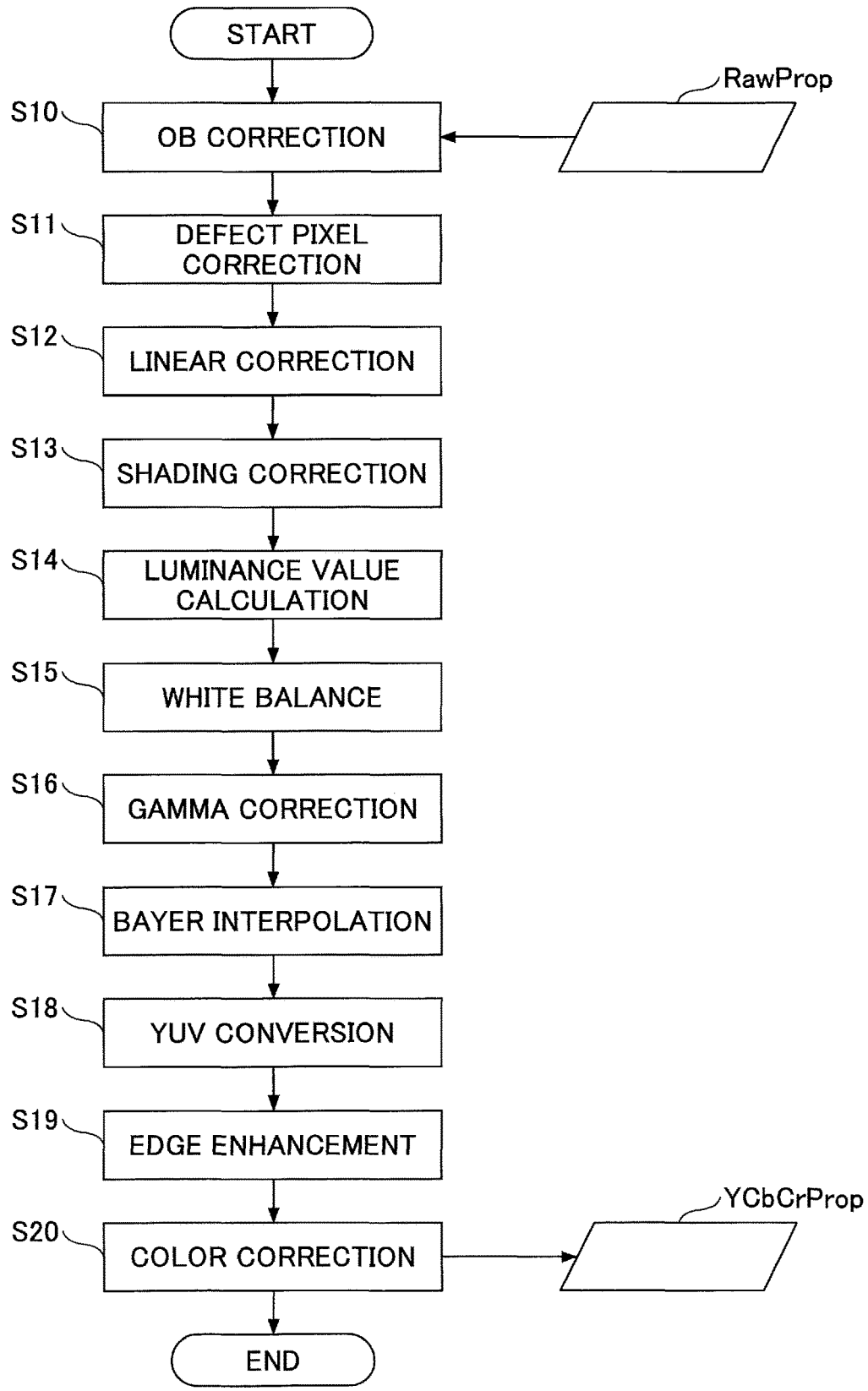
FIG. 4 is a flowchart illustrating example RAW image processing steps implemented by the image processing apparatus according to an embodiment of the present invention.

FIG. 4 is a flowchart illustrating example raw image processing steps implemented by the image processing apparatus according to an embodiment of the present invention. For example, in step S02, the image processing apparatus may perform the illustrated processing steps on each set of image data in the raw image format. In the following, an example case of performing the raw image processing steps on the first image data "RawProp" will be described.

In step S10, the image processing apparatus performs OB (Optical Black) correction. For example, in step S10, the image processing apparatus may perform a clamping correction process of clamping output signals of an effective pixel area according to the magnitude of noise in flares or dark portions.

In step S11, the image processing apparatus performs defective pixel correction. The solid-state imaging element has a plurality of pixels. As such, the solid state imaging element may be manufactured by forming a plurality of photosensitive elements, such as photodiodes, on a semiconductor substrate, for example. In manufacturing the solid-state imaging element, so-called defective pixels that cannot capture pixel values may be produced due to impurity contamination of the semiconductor substrate, for example. In order to compensate for such a defective pixel, the image processing apparatus generates a pixel value that compensates for the output of the defective pixel based on pixel values of neighboring pixels of the defective pixel.

In step S12, the image processing apparatus performs linear correction. That is, in step S12, the image processing apparatus performs linear correction with respect to each of the colors R (red), G (green), and B (blue).

In step S13, the image processing apparatus performs shading correction. For example, in step S13, the image processing apparatus may multiply an output signal of an effective pixel area by a predetermined correction coefficient to correct distortion due to shading of the effective pixel area. Note that the correction coefficient is a fixed value.

In step S14, the image processing apparatus calculates a luminance value. Specifically, first, in step S14, the image processing apparatus divides the image into predetermined regions. Then, the image processing apparatus calculates the average luminance value of each region based on the pixel values of each region. Note that the calculated average luminance value may be used for AE processing, for example.

In step S15, the image processing apparatus performs white balance processing. The solid-state imaging element has a color filter arranged on each photodiode. The spectral transmittance of the color filter differs depending on the color of the filter, and as such, the amount of charge accumulated in each photodiode may be different. Also, oftentimes, the solid-state imaging element is highly sensitive to green. On the other hand, red and blue sensitivities of the solid-state imaging element are oftentimes lower as compared with green sensitivity, and may sometimes be about half the green sensitivity. Thus, in white balance processing, for example, a process of applying a color gain to red and blue may be performed to compensate for the differences in color sensitivity and display the color white captured in an image as white. Also, the color of an imaged object may differ depending on the color of the light source (e.g., sunlight or fluorescent light). Thus, in white balance processing, for example, the color gain may be changed for each light source in order to display the color white as white according to the light source.

In step S16, the image processing apparatus performs gamma correction. Specifically, in gamma correction, nonlinear input/output conversion is performed. When the output has a nonlinear relationship with the input, oftentimes, the brightness of the output image may not have a smooth gradation. Also, if the image becomes dark, the image may not be visible to the human eye. Thus, the image processing apparatus performs nonlinear conversion with respect to an input signal to maintain the linearity of the output, taking into account characteristics of the output device.

In step S17, the image processing apparatus performs Bayer interpolation. When the photodiodes of the solid-state imaging element have color filters of various colors arranged thereon, image data output by the solid state imaging element indicate a pixel value of one color for each pixel. On the other hand, in order to display a color image, pixel values of three colors of red, green, and blue are required. Thus, the image processing apparatus performs an interpolation process, such as a bilinear interpolation process, with respect to each pixel to interpolate pixel values of missing colors from neighboring pixels.

In step S18, the image processing apparatus performs YCbCr conversion. That is, in step S18, the image processing apparatus converts image data in the raw image format indicating RGB values into image data in the YCbCr image format in which Y indicates a luminance, and Cb and Cr indicate color differences.

By performing such YCbCr conversion, for example, a YCbCr image as an example of a converted image is generated. In the following example, "Y" in the YCbCr image is an example of luminance. "Cb" in the YCbCr image is an example of a first color difference, and "Cr" in the YCbCr image is an example of a second color difference.

Note that the converted image is not limited to an image in the YCbCr image format. For example, the converted image may also be an image in some other format, such as the L*U*V* color space defined by CIE (Commission Internationale de l'eclairage) 1976, the L*a*b* color space defined by CIE 1976, or the YUV image format. In the following, an example case where the converted image is a YCbCr image will be described.

Note that JPEG images are often converted from image data in the YUV image format. Thus, image data may be converted into the YUV image format for conversion into JPEG images, for example.

In step S19, the image processing apparatus performs edge enhancement (YCFLT). For example, the image processing apparatus may perform an edge extraction filtering process for extracting edges based on luminance, gain multiplication for multiplying the extracted edge by a gain, a LPF (low pass filter) process for reducing noise, and image data addition after the gain multiplication and LPF process.

In step S20, the image processing apparatus performs color correction. For example, the image processing apparatus may perform saturation setting, hue setting, partial hue change setting, color suppression, or a combination thereof.

As a result of performing the illustrated raw image processing steps, first YCbCr image data "YCbCrProp" in the YCbCr image format is output.

Note that the RAW image processing steps are not limited to the illustrated processing steps. For example, a part of the illustrated processing steps may be omitted or other processing steps may be additionally performed.

Also, for example, the processing steps illustrated in FIG. 4 may also be performed on the second image data "RawU2", the third image data "RawU1", and the fourth image data "RawO1" illustrated in FIG. 3. In this way, second YCbCr image data "YCbCrU2", third YCbCr image data "YCbCrU1", and fourth YCbCr image data "YCbCrO1" may be generated.

Referring back to FIG. 3, in step S03, the image processing apparatus performs an image generation process.

Figure 5:
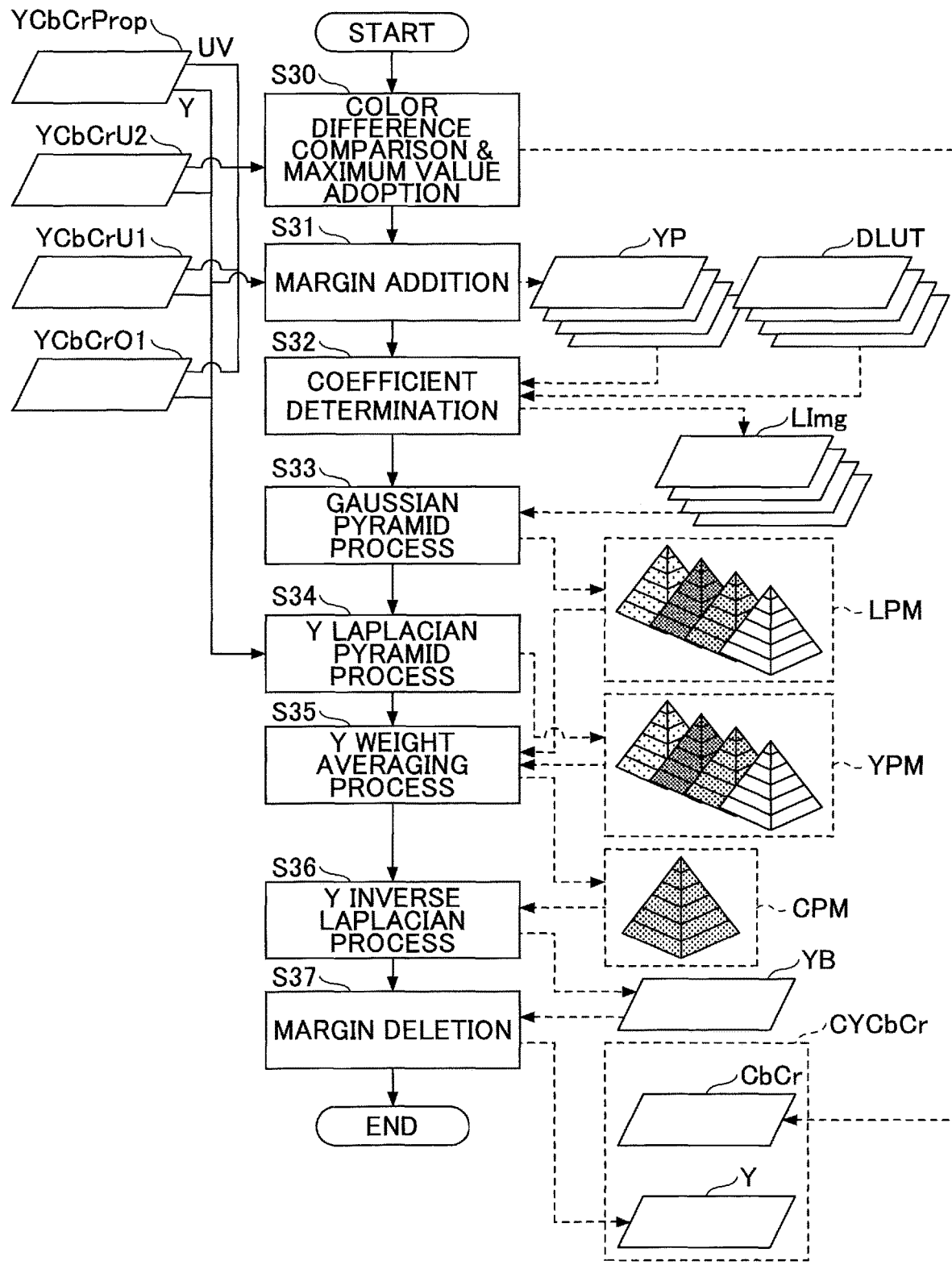
FIG. 5 is a flowchart illustrating an example image generation process implemented by the image processing apparatus according to an embodiment of the present invention.

FIG. 5 is a flowchart illustrating an example image generation process implemented by the image processing apparatus according to an embodiment of the present invention. For example, in step S03 of FIG. 3, the image processing apparatus may generate a composite image by compositing the first YCbCr image data "YCbCrProp", the second YCbCr image data "YCbCrU2", the third YCbCr image data "YCbCrU1", and the fourth YCbCr image data "YCbCrO1" generated in step S02.

In step S30, the image processing apparatus compares the color difference values of the YCbCr images with each other and adopts maximum values of the compared values. First, the image processing apparatus extracts color difference value data, i.e., Cr value data and Cb value data, from the YCbCr images. Then, the image processing apparatus compares the Cr values and the Cb values of each pixel. In the present example, among the Cr values and the Cb values of the four YCbCr images, the Cr value and the Cb value having the greatest absolute value are adopted. By adopting maximum values as described above, the image processing apparatus can generate a composite image using color difference values with large absolute values. In this way, the image processing apparatus can generate a high-quality composite image with enhanced saturation. Also, because computations associated with step S30 can be performed at high speed, the image processing apparatus can accelerate processing speed.

Note that when the extent of saturation correction is desirably suppressed, for example, the image processing apparatus may calculate a sum of color difference square values by adding together a Cb square value corresponding to a square of the Cb value of a YCbCr image as an example of a first color difference square value and a Cr square value corresponding to a square of the Cr value of the YCbCr image as an example of a second color difference square value, and compare the sums calculated with respect to the multiple YCbCr images. That is, for each pixel, the image processing apparatus may determine the Cb value and the Cr value that have been used in the calculation of the sum having the greatest absolute value from among the calculated sums, and use these maximum values to generate a composite image.

Also, the image processing apparatus does not necessarily have to use all the captured images as original images for calculating the above maximum values. For example, the image processing apparatus may exclude a part of the images, such as the image data generated under the condition "O1Exp" in calculating the maximum values. By only using images that can be expected to generate an appropriate color difference as described above, the image processing apparatus can generate a high-quality composite image with more appropriate saturation. In the following, image data indicating the Cr value and the Cb value of the composite image generated in step S30 will be referred to as composite CbCr image "CbCr".

In step S31, the image processing apparatus performs a process of adding a margin. Specifically, first, the image processing apparatus extracts luminance data, i.e., Y value data, from the YCbCr images. Then, the image processing apparatus adjusts the data size by adding a margin to the Y value data, for example, so that the Y value data can be represented by a predetermined number of pyramid levels.

For example, assuming the number of pyramid levels to be generated is "N" as described below in connection with subsequent processes, the image processing apparatus determines whether values representing the width and height of the Y value data are divisible by "$2^{(N-1)}$". If the values are not divisible by "$2^{(N-1)}$", the image processing apparatus adds a margin to the Y value data.

As a method of adding a margin, for example, pixel values of the edges of the Y value data may be copied. Also, other possible methods of adding a margin include adding pixel values of a fixed value, for example.

In the following, the Y value data to which a margin has been added in step S31 is referred to as margin-added Y value data "YP". Note that the margin-added Y value data "YP" is generated for each YCbCr image data of the four YCbCr images. In the following descriptions, margin-added Y value data of one image that is selected from among the margin-added Y value data of the four YCbCr images is referred to as margin-added Y value data "YP".

In step S32, the image processing apparatus determines a coefficient. For example, the coefficient may be determined based on coefficient data that is input in advance (hereinafter referred to as coefficient data "DLUT"). Note that different sets of coefficient data DLUT are provided for different exposure conditions, for example. Further, the coefficient data DLUT may be data in the LUT (Look Up Table) format, for example.

A coefficient is used to normalize weights of the Y value data for each pixel. For example, normalization can be expressed by the following formula (1).

$$w_e(x, y) = \frac{LUT_e(Y_e(x, y))}{\sum_{e=0}^{M-1} LUT_e(Y_e(x, y))} \quad (1)$$

In the above formula (1), "$w_e$" represents a normalized weight coefficient for exposure condition "e". Also, "$LUT_e$" represents coefficient data DLUT, i.e., a LUT, for the exposure condition "e". Further, "$Y_e$" represents luminance under the exposure condition "e". As can be appreciated from the above, normalization is a process implemented with respect to each pixel such that a sum of the weight coefficients for each exposure condition will be equal to "1".

Figure 6:
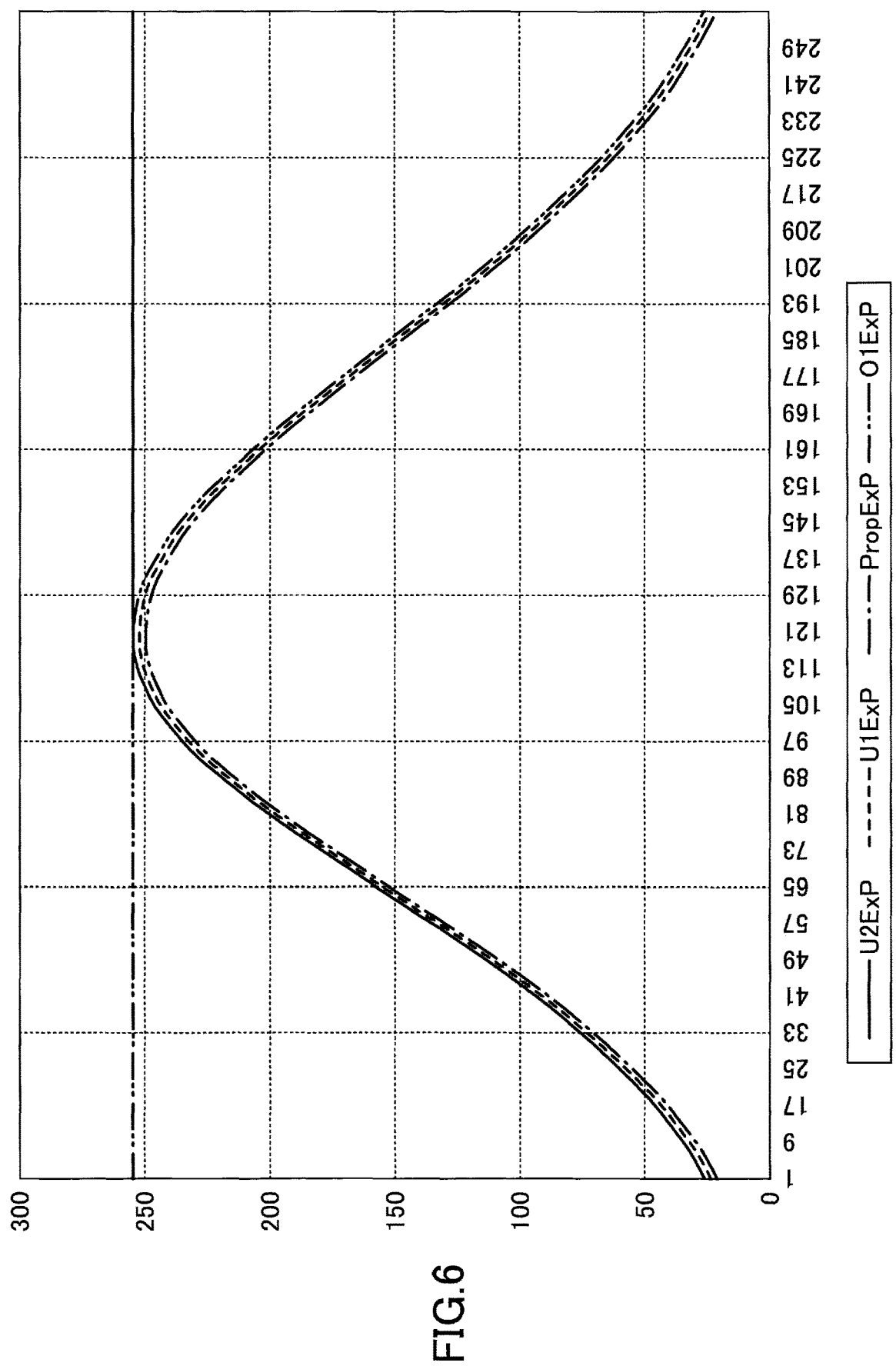
FIG. 6 is a diagram illustrating an example of coefficient data according to an embodiment of the present invention.

FIG. 6 is a graph illustrating an example of coefficient data according to an embodiment of the present invention. The coefficient data may be a LUT that outputs a value representing a "use ratio" for an input representing a luminance value "Y". That is, as the "use ratio" increases, a weight used for the corresponding luminance in generating a composite image increases. Also, in FIG. 6, the horizontal axis represents the input and the vertical axis represents the output corresponding to the input for each image capturing condition. A value greater than "0" is set up as the use ratio. Also, the value of "Y" is within a range "from 0 to 255". Further, in the following example, it is assumed that the "use ratio" has a denominator equal to "255" and a numerator equal to a value "from 1 to 255". That is, the LUT converts an 8-bit value to an 8-bit value. As such, in the present example, the LUT is 256 bytes of data.

In the present example, the LUT for "U2Exp" for capturing a dark image to increase the resolution of a high luminance portion is set up so that the ratio for a value on the bright side is increased, while the ratio for a value on the dark side is decreased. As shown in FIG. 6, the LUT for "U2EXP" is set up so that a high output, such as "1", is output when a luminance value on the bright side, i.e., a luminance value greater than or equal to a predetermined value, is input. In this way, a weight used for a luminance value greater than or equal to a predetermined value in generating a composite image may be increased.

On the other hand, the LUT for "O1Exp" for capturing a bright image to increase the resolution of a low luminance portion is set up so that the ratio for a value on the bright side is decreased, while the ratio for a value on the dark side is increased. As shown in FIG. 6, the LUT for "O1Exp" is set up so that a high input, such as "1", is output when a luminance value on the dark side, i.e., a luminance value less than or equal to a predetermined value, is input. In this way, a weight used for a luminance value less than or equal to a predetermined value in generating a composite image may be increased.

Note that in the present example, the predetermined value is set to "255÷2≈127". Also, the predetermined value is a preset value.

Further, the LUTs for "PropExp" and "U1Exp" for capturing images under midlevel image capturing conditions are set up so that the ratio for values near the center where "Y=0.5" is increased. For example, the LUTs for "PropExp" and "U1Exp" may be substantially the same as illustrated in FIG. 6. By setting up coefficient data for each image capturing condition in the above-described manner, the image processing apparatus may be able to increase the resolutions of bright regions and dark regions to thereby generate an image in which the overall brightness is maintained. In the following, an image generated using such LUT will be referred to as a weighted image "LImg".

Referring back to FIG. 5, in step S33, the image processing apparatus performs a Gaussian pyramid process. For example, the Gaussian pyramid process may involve generating a Gaussian pyramid LPM from the weighted image LImg generated in step S32. It is assumed that the generated Gaussian pyramid LPM has pyramid image levels up to level "N" where N is a predetermined number. A pyramid process may be a process of changing the resolution of one image to generate a plurality of images, for example. In the following, the term is used to refer to such a process.

In step S34, the image processing apparatus performs a Y Laplacian pyramid process. For example, the Y Laplacian pyramid process may involve generating a Laplacian pyramid YPM from the Y value data of each YCbCr image. It is assumed that the generated Laplacian pyramid YPM has pyramid image levels up to level "N" where N is a predetermined number.

In step S35, the image processing apparatus performs a Y weight averaging processing. More specifically, in step S35, the image processing apparatus multiplies the Gaussian pyramid LPM by the Laplacian pyramid YPM to generate a composite Laplacian pyramid CPM. The composite Laplacian pyramid CPM may be expressed by the following formula (2).

$$Yw_j(x,y) = \sum_{e=0}^{M-1} e_j(x,y) \cdot Y_{e,j}(x,y) \quad (2)$$

In the above formula (2), "$Yw_j$" represents an image of level "j" in the composite Laplacian pyramid CPM. In the above formula (2), "$w_{e,j}$" represents an image of level "j" in the Gaussian pyramid LPM generated from a weighted image that is applied the normalized weight coefficient associated with the exposure condition "e". Further, in the above formula (2), "$Y_{e,j}$" represents an image of level "j" in the Laplacian pyramid YPM generated from the Y value data associated with the exposure condition "e".

In step S36, the image processing apparatus performs a Y inverse Laplacian process. That is, in step S36, the image processing apparatus performs a Y inverse Laplacian process on the composite Laplacian pyramid CPM generated in step S35 to generate post-compositing Y value data YB. Note that the post-compositing Y value data YB includes a margin.

In step S37, the image processing apparatus deletes the margin. That is, the image processing apparatus deletes the margin from the post-compositing Y value data YB generated in step S36. In the following, an image represented by the image data generated in step S37 is referred to as composite Y image "Y".

By compositing image data of the composite Y image "Y" and the composite CbCr image "CbCr", composite image data "CYCbCr" is generated.

Note that in the image generation process illustrated in FIG. 5, CbCr-related processing, such as the process of step S30, is preferably performed before Y-related processing. With such a processing order, memory used for CbCr-related processing may be freed up for use in Y-related processing. That is, by arranging the processing order such that CbCr-related processing is performed first, the image processing apparatus can improve memory use efficiency.

Second Embodiment

In the following, an example using a camera that captures an omnidirectional image with two fisheye lenses (hereinafter referred to as "omnidirectional camera") will be described. The omnidirectional camera generates an output image by stitching together a plurality of captured images. Note that the omnidirectional camera is an example of a so-called compound eye image processing apparatus having two solid-state image pickup elements. Captured images captured by the solid-state imaging elements preferably have margins for enabling generation of a multiple exposure image and margins for enabling pyramid processing for generating pyramid images up to level "N". Specifically, the captured images are preferably formed by light being incident on regions where the captured images are stitched together and on at least "$2^{(N-1)}$" margin pixels.

<Overall Process Example>

Figure 7:
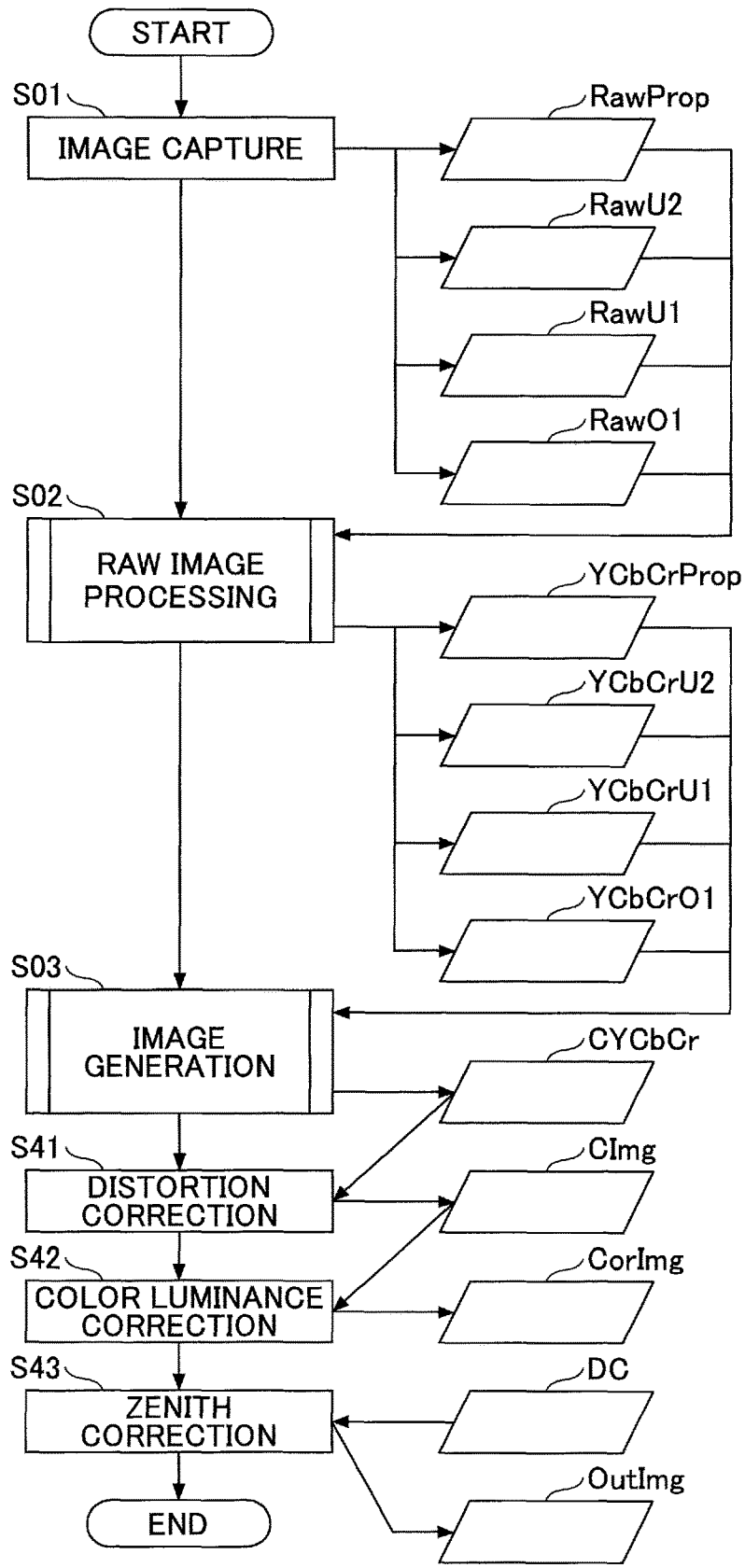
FIG. 7 is a flowchart illustrating an example overall process implemented by an image processing apparatus according to another embodiment of the present invention.

FIG. 7 is a flowchart illustrating an example overall process implemented by the image processing apparatus according to a second embodiment of the present invention. In the following description of the process of FIG. 7, process steps that are substantially identical to the process steps of FIG. 3 are given the same reference numerals and overlapping descriptions are omitted. The process of FIG. 7 differs from that of FIG. 3 in that it includes further processes of step S41 and onward. Also, in the omnidirectional camera having two solid-state imaging elements, processes directed to a captured image are performed with respect to each captured image generated by each of the solid-state imaging elements. Thus, in the present example, processes directed to a captured image are each performed twice, and a processed image is generated based on each of the captured images.

In step S41, the image processing apparatus performs distortion correction. That is, in step S41, the image processing apparatus performs distortion correction to generate a so-called equidistant cylindrical image. The equidistant cylindrical image is composed of a plurality of captured images corresponding to so-called fisheye images, for example. Also, when generating the equidistant cylindrical image, a stitching process is performed at portions where the fisheye images are stitched together.

In the present example, each fisheye image corresponds to an image represented by composite image data "CYCbCr". Thus, each image represented by composite image data "CYCbCr" is subjected to distortion correction to generate a compound eye image "CImg".

In step S42, the image processing apparatus performs color luminance correction. For example, due to the influence of flare or the like, a color difference or luminance difference may be generated between the images captured by the two solid-state imaging elements. As such, brightness or color banding (steps) may occur at stitched portions, for example. Thus, in step S42, the image processing apparatus performs color luminance correction to correct such steps. For example, the color luminance correction process may involve arranging a stitched portion at an equatorial position of an image and performing correction on the stitched portion to generate a corrected image "CorImg".

Note that the process of step S42 is preferably performed after processes directed to a captured image, such as step S03, are performed. In this way, each image captured by each solid-state imaging element may be separately processed. As a result, the image processing apparatus can improve the image quality of an output image.

In step S43, the image processing apparatus performs zenith correction. For example, the zenith correction may be performed based on acceleration sensor data "DC". In the present example, the image processing apparatus uses a zenith direction indicated by the acceleration sensor data "DC" as a reference to correct a direction indicated by an image. An output image "OutImg" is generated as a result of performing such correction.

<Functional Configuration Example>

Figure 8:
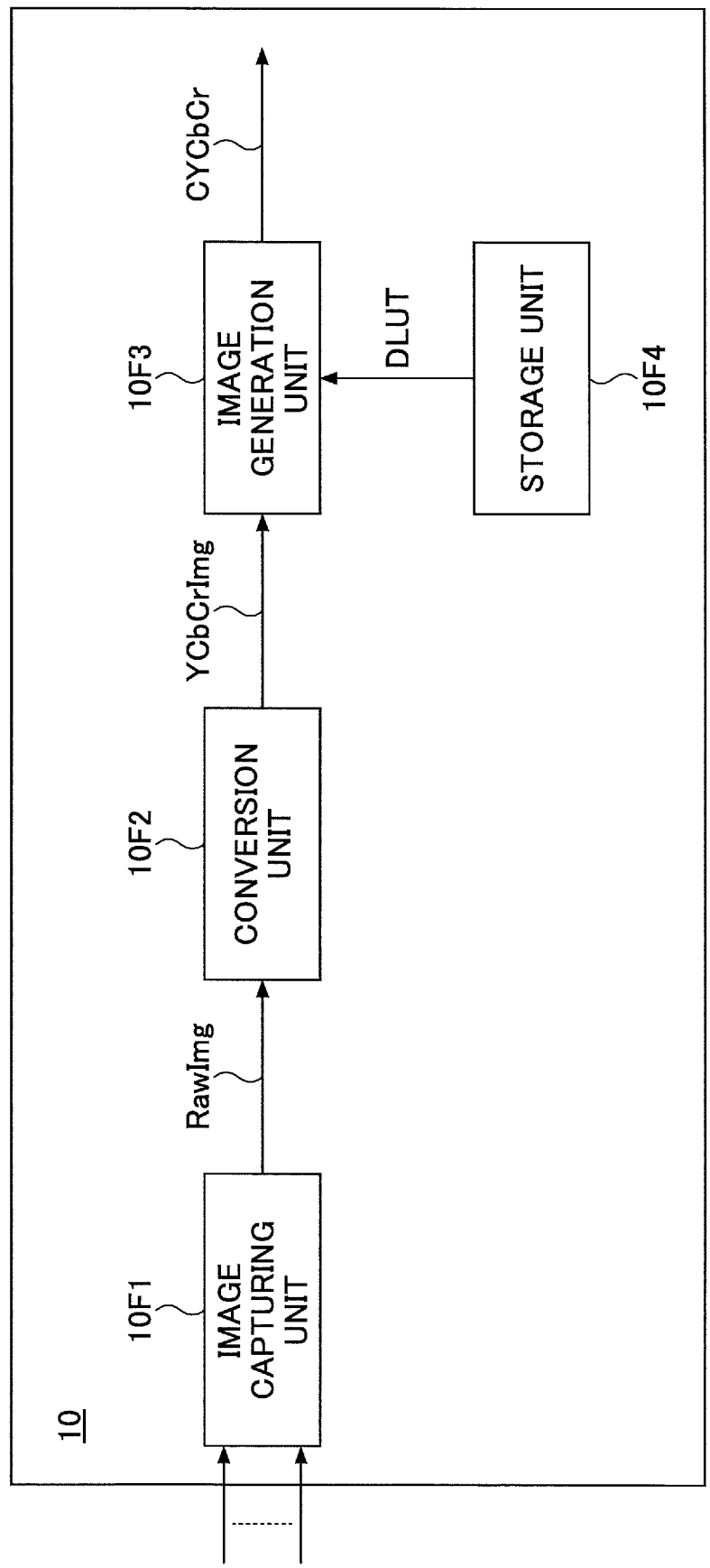
FIG. 8 is a block diagram illustrating an example functional configuration of the image processing apparatus according to an embodiment of the present invention.

FIG. 8 is a block diagram illustrating an example functional configuration of the image processing apparatus according to an embodiment of the present invention. In FIG. 8, the image processing apparatus 10 includes an image capturing unit 10F1, a conversion unit 10F2, an image generation unit 10F3, and a storage unit 10F4.

The image capturing unit 10F1 performs image capturing operations multiple times under different image capturing conditions to generate multiple captured images "RawImg". The captured images may correspond to the first image data "RawProp", the second image data "RawU2", the third image data "RawU1", and the fourth image data "RawO1" illustrated in FIG. 3, for example. Further, the image capturing unit 10F1 may be implemented by the image capturing device 12 illustrated in FIG. 2, for example.

The conversion unit 10F2 converts a captured image "RawImg" to generate a YCbCr image "YCbCrImg". Note that the conversion unit 10F2 may perform the process operations illustrated in FIG. 4, for example, to generate the YCbCr image "YCbCrImg" based on the captured image "RawImg". Further, the conversion unit 10F2 may be implemented by the ISP 6 illustrated in FIG. 2, for example.

The storage unit 10F4 stores coefficient data indicating a coefficient for the luminance of the YCbCr image "YCbCrImg" for each image capturing condition. The storage unit 10F4 may store the coefficient data DLUT as illustrated in FIG. 5, for example. That is, the storage unit 10F4 may store coefficient data as illustrated in FIG. 6, for example. Further, the storage unit 10F4 may be implemented by the ROM 26 illustrated in FIG. 2, for example.

The image generation unit 10F3 generates a composite image "CYCbCr" by compositing multiple YCbCr images based on the coefficient data stored in the storage unit 10F4. For example, the image generation unit 10F3 may perform the process operations illustrated in FIG. 5 to generate the composite image "CYCbCr". Further, the image generation unit 10F3 may be implemented by the ISP 6 illustrated in FIG. 2, for example.

Further, an image processing apparatus, such as an omnidirectional camera, that uses compound eyes to capture images may perform further processes (e.g., distortion correction) as illustrated in FIG. 7 on multiple composite images CYCbCr generated by the image generation unit 10F3, for example. In this case, the image processing apparatus may further perform processes of stitching together the multiple composite images CYCbCr, and the image processing apparatus may further include an output unit for outputting an output image, for example.

Note that the color difference is not limited to the Cr value and the Cb value of a YCbCr image. For example, the color difference may be "a" and "b" in the Lab color space. Further, the color difference may be "U" and "V" in the YUV color space, for example.

Note that all or part of the processes according to embodiments of the present invention may be implemented by a program to be executed by a computer that is described in a legacy programming language, such as assembler, C, C++, C#, or Java (registered trademark), or an object-oriented programming language, for example. That is, the program is a computer program for causing a computer included in an image processing apparatus to execute an image processing method.

Further, the program may be stored in a computer-readable recording medium, such as a ROM or an EEPROM (Electrically Erasable Programmable ROM), and distributed in such stored state, for example. Further, the recording medium may also be an EPROM (Erasable Programmable ROM), a flash memory, a flexible disk, a CD-ROM, a CD-RW, a DVD-ROM, a DVD-RAM, a DVD-RW, a Blu-ray Disc, a SD (registered trademark) card, or a MO (magneto-optical) disk, for example. The program may also be distributed via an electric communication line, for example.

Although the present invention has been described above with respect to certain illustrative embodiments, the present invention is not limited to these embodiments, and numerous variations and modifications may be made without departing from the scope of the present invention.

What is claimed is:

1. An image processing apparatus that processes an image, the image processing apparatus comprising:
    an image capturing device configured to perform image capturing operations a plurality of times under different image capturing conditions to generate a plurality of captured images;
    a storage device configured to store coefficient data for each of the image capturing conditions; and
    a processor configured to implement processes of
        converting a captured image of the plurality of captured images to generate a converted image indicating a luminance and a color difference;
        generating a composite image by compositing a plurality of the converted images based on the coefficient data for each of the image capturing conditions, the coefficient data indicating a coefficient for the luminance indicated by each of the converted images; and
        comparing the color difference indicated by each of the converted images with each other and adopting, for each pixel, the color difference that has a greatest absolute value from among the compared color differences to generate the composite image.

2. An image processing apparatus that processes an image, the image processing apparatus comprising:
    an image capturing device configured to perform image capturing operations a plurality of times under different image capturing conditions to generate a plurality of captured images;
    a storage device configured to store coefficient data for each of the image capturing conditions; and
    a processor configured to implement processes of
        converting a captured image of the plurality of captured images to generate a converted image indicating a luminance and a color difference;
        generating a composite image by compositing a plurality of the converted images based on the coefficient data for each of the image capturing conditions, the coefficient data indicating a coefficient for the luminance indicated by each of the converted images, wherein
    the color difference indicated by each of the converted images includes a first color difference and a second color difference, which is different from the first color difference;
    the processor calculates a sum of a first color difference square value and a second color difference square value for each of the converted images and compares the sum for each of the converted images with each other, the first color difference square value corresponding to a square of the first color difference, and the second color difference square value corresponding to a square of the second color difference; and
    the processor adopts the color difference that has a greatest absolute value from among the compared color differences, for each pixel, by selecting the first color difference and the second color difference that have been used in the calculation of the sum having a greatest absolute value from among the compared sums to generate the composite image.

3. The image processing apparatus according to claim 1, wherein
the different image capturing conditions include a first image capturing condition in which the captured images are underexposed, and a second image capturing condition in which the captured images are overexposed;
the coefficient data for the first image capturing condition is set up so that a weight used for a luminance greater than or equal to a first predetermined value in generating the composite image is increased; and
the coefficient data for the second image capturing condition is set up so that a weight for a luminance less than or equal to a second predetermined value in generating the composite image is increased.

4. The image processing apparatus according to claim 1, wherein
the image capturing device is a compound eye image capturing device, and
the processor stitches together a plurality of the composite images to output an output image.

5. An image processing method implemented by an image processing apparatus that processes an image, the image processing method comprising:
performing image capturing operations a plurality of times under different image capturing conditions to generate a plurality of captured images;
storing coefficient data for each of the image capturing conditions;
converting a captured image of the plurality of captured images to generate a converted image indicating a luminance and a color difference; and
generating a composite image by compositing a plurality of the converted images based on the coefficient data for each of the image capturing conditions, the coefficient data indicating a coefficient for the luminance indicated by each of the converted images; and
comparing the color difference indicated by each of the converted images with each other and adopting, for each pixel, the color difference that has a greatest absolute value from among the compared color differences to generate the composite image.

6. An image processing method implemented by an image processing apparatus that processes an image, the image processing method comprising:
performing image capturing operations a plurality of times under different image capturing conditions to generate a plurality of captured images;
storing coefficient data for each of the image capturing conditions;
converting a captured image of the plurality of captured images to generate a converted image indicating a luminance and a color difference, the color difference indicated by each of the converted images including a first color difference and a second color difference different from the first color difference; and
generating a composite image by compositing a plurality of the converted images based on the coefficient data for each of the image capturing conditions, the coefficient data indicating a coefficient for the luminance indicated by each of the converted images
calculating a sum of a first color difference square value and a second color difference square value for each of the converted images and comparing the sum for each of the converted images with each other, the first color difference square value corresponding to a square of the first color difference, and the second color difference square value corresponding to a square of the second color difference; and
adopting the color difference that has a greatest absolute value from among the compared color differences, for each pixel, by selecting the first color difference and the second color difference that have been used in calculating the sum having a greatest absolute value from among the compared sums to generate the composite image.

7. The image processing apparatus according to claim 2, wherein
the different image capturing conditions include a first image capturing condition in which the captured images are underexposed, and a second image capturing condition in which the captured images are overexposed;
the coefficient data for the first image capturing condition is set up so that a weight used for a luminance greater than or equal to a first predetermined value in generating the composite image is increased; and
the coefficient data for the second image capturing condition is set up so that a weight for a luminance less than or equal to a second predetermined value in generating the composite image is increased.

8. The image processing apparatus according to claim 2, wherein
the image capturing device is a compound eye image capturing device, and
the processor stitches together a plurality of the composite images to output an output image.

\* \* \* \* \*